United States Patent
Sonpatki et al.

(12)

(10) Patent No.: US 6,741,382 B1
(45) Date of Patent: May 25, 2004

(54) ACOUSTO-OPTIC ACTIVITY FOR ACOUSTIC IMAGING

(76) Inventors: Milind M. Sonpatki, 1668 Sheldrake Dr. #1B, Wheeling, IL (US) 60090; Honghui Wang, 341 S. Jewel Ct., Palatine, IL (US) 60067; Jaswinder S. Sandhu, 454 Carmen Ave., Buffalo Grove, IL (US) 60089

( * ) Notice: Subject to any disclaimer, the term of this patent is extended or adjusted under 35 U.S.C. 154(b) by 0 days.

(21) Appl. No.: 10/611,057

(22) Filed: Jul. 1, 2003

(51) Int. Cl.$^7$ .................................................. G02F 1/11
(52) U.S. Cl. ........................................ 359/285; 359/305
(58) Field of Search ................................ 359/285, 282, 359/254, 247, 250, 305, 237

(56) References Cited

U.S. PATENT DOCUMENTS 6,049,411 A    4/2000  Sandhu
6,628,451 B2 *  9/2003  Sandhu et al. ............... 359/285

* cited by examiner

Primary Examiner—Hung X. Dang
(74) Attorney, Agent, or Firm—Don Moyer

(57) ABSTRACT

A first medium having an acousto-optic activity and a second medium are combined to form a net medium having a net acousto-optic activity greater than the acousto-optic activity of the first medium, where the improvement is substantiated via measurements made at specific viewing conditions, and where the second medium can be chosen because it effects at least one of three key properties of the net medium.

8 Claims, 1 Drawing Sheet

ACOUSTO-OPTIC ACTIVITY FOR ACOUSTIC IMAGING

The improved acousto-optic activity for acoustic imaging which is provided by this method—and product—is substantiated via measurements made at specific viewing conditions.

The improvement is accomplished by adding second media to first media to form net media and comparing the acousto-optic activities of first media and net media. Without using specific viewing conditions the improvement can not be reliably confirmed and can not be reliably useful.

In this comparing of various media it was discovered that the data were not reliable until the media are imaged at optimum angles because—it was discovered—the optimum viewing angles of the first media and the net media differed.

Accurate measurements to compare acousto-optic activities of media depend on the optimum angle viewing art taught by Sandhu in U.S. Pat. No. 6,049,411 filed 14 Oct. 1998 and issued 11 Apr. 2000 and which is incorporated herein by reference.

Figure 1:
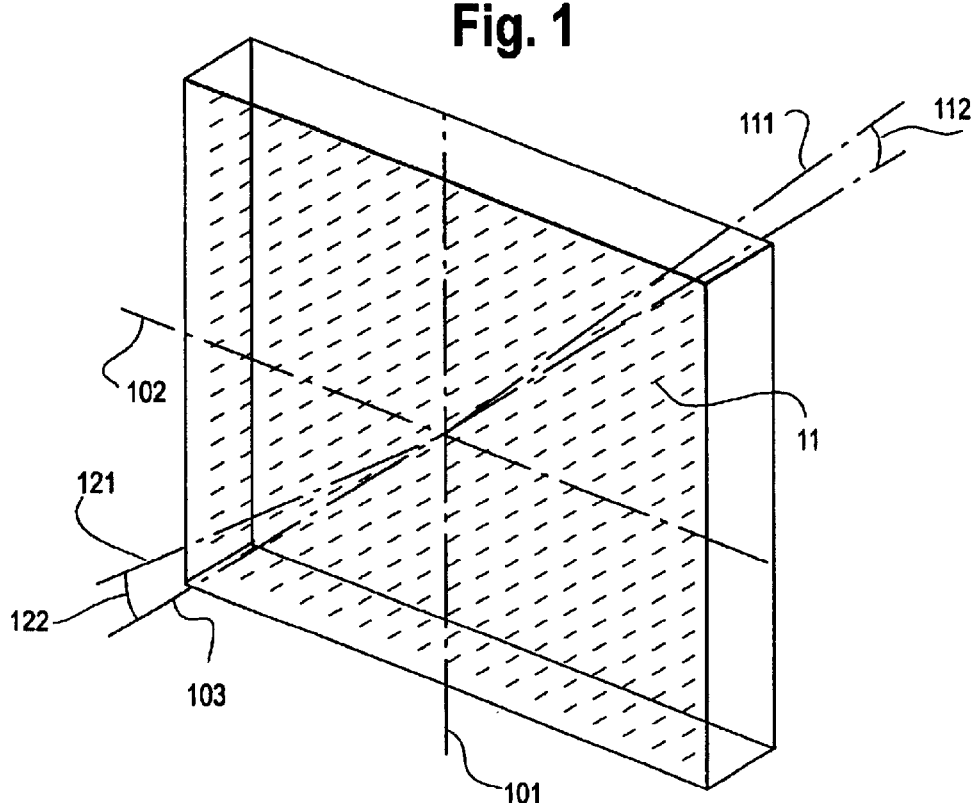

FIG. 1 shows reference coordinates for viewing conditions of a first medium 11. Axis 103 is normal to a face of the medium and axes 101, 102 are orthogonal to 103 and to each other. The central ray of acoustic energy 111 enters the medium at an angle 112 away from the normal axis. The central ray of viewing the medium 121 is at the optimum viewing angle 122 from the normal axis. Acoustic energy can enter the medium via the same face which is viewed.

Figure 2:
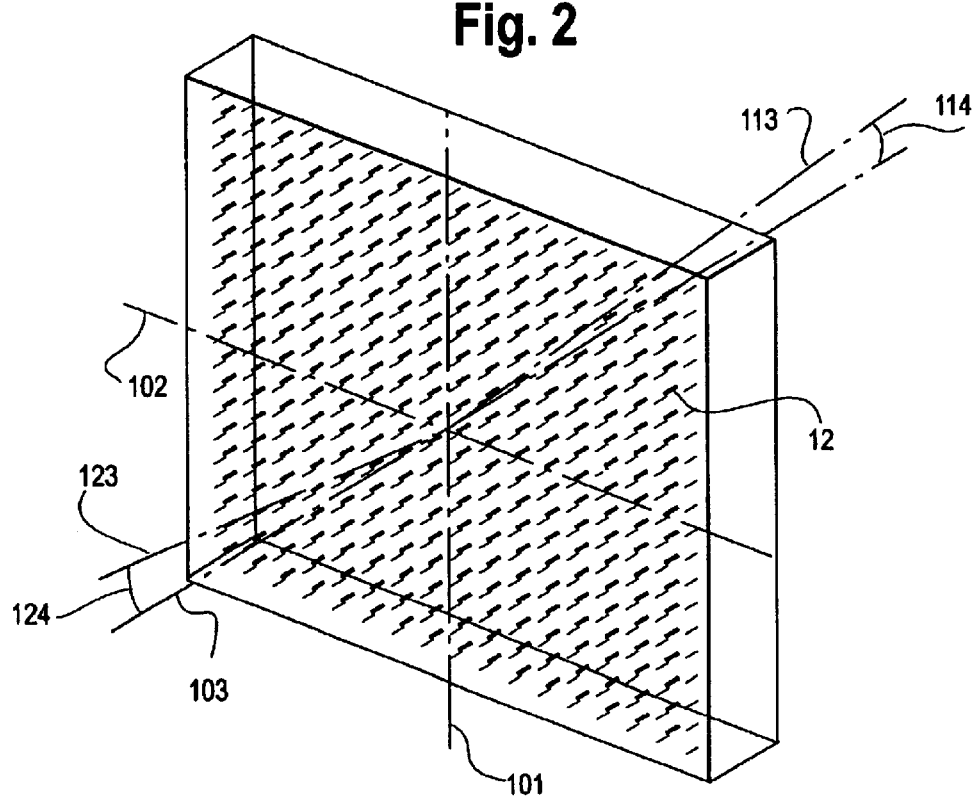

FIG. 2 shows reference coordinates for viewing conditions of a second medium 12. Here the central ray of acoustic energy 113 enters the medium at an angle 114 away from the normal axis. The central ray of viewing the medium 123 is at the optimum viewing angle 124 away from the normal axis. Acoustic energy can enter the medium via the same face which is viewed.

The method for improving acousto-optic activity for acoustic imaging comprises choosing a first medium, choosing a second medium, and adding the second medium to the first medium to form a net medium.

The first medium is chosen to have a first acousto-optic activity which causes a first optical property of the first medium to change with changes in acoustic energy intensity interacting with the first medium. The net medium has a net acousto-optic activity which causes a net optical property of the net medium to change with changes in acoustic energy intensity interacting with the net medium.

The method also comprises establishing that the net acousto-optic activity is greater than the first acousto-optic activity by determining a first optimum angle for imaging the first medium, determining a net optimum angle for imaging the net medium, choosing a value of a viewing baseline, and comparing a first acousto-optic threshold of the first medium with a second acousto-optic threshold of the net medium, where the first acousto-optic threshold is measured at the first optimum angle and from the value of viewing baseline, and where the net acousto-optic threshold is measured at the net optimum angle and from the value of viewing baseline.

Choosing the second medium can comprise choosing the second medium because the second medium causes a net orthogonal acoustic energy absorption ratio of the net medium to be greater than a corresponding first orthogonal acoustic energy absorption ratio of the first medium.

Choosing the second medium can comprise choosing the second medium because the second medium causes a net birefringence of the net medium to be greater than a corresponding first birefringence of the first medium, and adding the second medium to the first medium to form the net medium.

Choosing the second medium can comprise choosing the second medium because the second medium causes a net elastic modulus of the net medium to be lower than a corresponding first elastic modulus of the first medium.

Choosing the second medium can:comprise choosing the second medium because the second medium has any two of these properties, and can comprise choosing the second medium because the second medium has all three of these properties.

The product with improved acousto-optic activity for acoustic imaging comprises a net medium which is formed by adding a second medium to a first medium.

The first medium has a first acousto-optic activity which causes an optical property of the first medium to change with changes in acoustic energy intensity interacting with the first medium. The net medium has a net acousto-optic activity which causes a net optical property of the net medium to change with changes in acoustic energy intensity interacting with the net medium.

The net acousto-optic activity is greater than the first acousto-optic activity when the first acousto-optic activity is measured at a predetermined first optimum angle for imaging the first medium and from a predetmined viewing baseline, and the net acousto-optic activity is measured at a predetermined net optimum angle for imaging the net medium and from the predetermined viewing baseline.

The second medium can have a property which causes a net orthogonal acoustic energy absorption ratio of the net medium to be greater than a corresponding first orthogonal acoustic energy absorption ratio of the first medium.

The second medium can have a property which causes a net birefringence of the net medium to be greater than a corresponding first birefringence of the first medium.

The second medium can have a property which causes a net elastic modulus of the net medium to be lower than a corresponding first elastic modulus of the first medium.

The second medium can have any two of these properties and can have all three of these properties.

The first medium is chosen to have a first acousto-optic activity which causes an optical property of the first medium to change with changes in acoustic energy intensity interacting with the first medium. Preferably the first medium is chosen to be a nematic liquid crystal.

The second medium which is chosen so that the net medium has a net acousto-optic activity which causes the optical property to change more with changes in acoustic energy intensity interacting with the net medium than the first acousto-optic activity causes the optical property to change with changes in acoustic energy intensity interacting with the first medium. Preferably the second medium is chosen to comprise a second nematic liquid crystal.

The second medium can be chosen to change at least one of three properties of the net medium relative to the first medium. The three properties are an absorption property, a birefringence property, and an elastic property.

The absorption property causes a net orthogonal acoustic energy absorption ratio of the net medium to be greater than a corresponding first orthogonal acoustic energy absorption ratio of the first medium. For example, if a first nematic liquid crystal and a net nematic liquid crystal have molecules with long axes aligned parallel to axis 103, then the ratio of acoustic energy absorption along the long axis of the net medium molecules to the acoustic energy absorption orthogonal to this long axis is greater than ratio of acoustic energy absorption along the long axis of the first medium molecules to the acoustic energy absorption orthogonal to this long axis.

The birefringence property causes a net birefringence of the net medium to be greater than a corresponding first birefringence of the first medium.

The elastic property causes a net elastic modulus of the net medium to be less than a corresponding first elastic modulus of the first medium. The elastic modulus is known in the liquid crystal art as the bend elastic modulus.

In all cases described here—above and below—the first medium can be a mixture of media and the second medium can be a mixture of media.

In one typical example, a first medium provided by EM Industries, has the trade name E70. A second medium, provided by EM Industries, has the trade name RM257. Adding ten percent, by weight, of RM257 to E70 produces a net acousto-optic activity greater than that of EM70.

The acousto-optic activity here is birefringence. Thus the measurement of the acousto-optic activity depends on imaging the medium along a line 121 which is at an optimum viewing angle 122 from the axis 103. This optimum angle depends on properties of the medium. This art was taught first by taught by Sandhu in U. S. Pat. No. 6,049,411.

In the process of comparing various first media and net media it was discovered that the data were not reliable until both media are imaged at their respective optimum viewing angles. The change in acousto-optic activity from the first medium to the net medium can be miss-measured because the optimum viewing angle for the net medium 124 can be different from the optimum viewing angle for the first medium 122.

The acoustic energy incident angles—111, 113—can also be respectively optimized.

The optimum angle for the E70 medium is found to be 9.5 degrees. The optimum angle for the net medium is found to be 8 degrees. Improvements in acousto-optic activity will be missed if the media are not compared at their respective optimum angles.

Acousto-optic activities can be compared by comparing the energy threshold at which an acousto-optic effect can be reliably seen. The experimental setup is that described in U. S. Pat. 6,049,411. The imager output is represented by shades of brightness.

Acoustic energy—which changes the light which has interacted with the media by a preset number of shades of brightness (eight shades in the example) from a baseline brightness value, compared with the original state of the media—is incident on the media. Then the threshold is represented by the peak to peak AC voltage applied across the media needed to return the media to the original state.

In the process of comparing various first media and net media it was discovered that comparisons were not reliable until the thresholds were measured from the same brightness baseline value. It was discovered that the relationship between thresholds and baseline value for various media differed. Thus the increase in acousto-optic activity is miss-measured unless the media are compared at the same baseline value.

The viewing baselines are the shades of brightness of the original state of the media. Thresholds versus viewing baselines curves diverge at low values of viewing baselines and converge at high values of viewing baselines. Comparisons of thresholds at the same intermediate value of brightness baseline (forty shades in the example) are repeatable.

A value of viewing baseline could be chosen based on experience with media without measuring the threshold versus baseline relation for each new medium. However, this shortcut could lead to unreliable comparisons. Thus it is preferred—but not required—to measure the threshold versus baseline relation for each new medium in order to chose a value of viewing baseline to obtain reliable comparisons.

What is claimed is:

1. A method for improving acousto-optic activity for acoustic imaging, the method comprising:
    choosing a first medium,
    the first medium being chosen to have a first acousto-optic activity which causes a first optical property of the first medium to change with changes in acoustic energy intensity interacting with the first medium;
    choosing a second medium;
    adding the second medium to the first medium to form a net medium,
    the net medium having a net acousto-optic activity which causes a net optical property of the net medium to change with changes in acoustic energy intensity interacting with the net medium;
    substantiating that the net acousto-optic activity is greater than the first acousto-optic activity, by:
        determining a first optimum angle for imaging the first medium;
        determining a net optimum angle for imaging the net medium;
        choosing a value of a viewing baseline;
        comparing a first acousto-optic threshold of the first medium with a second acousto-optic threshold of the net medium,
        where the first acousto-optic threshold is measured at the first optimum angle and from the value of viewing baseline, and
        where the net acousto-optic threshold is measured at the net optimum angle and from the value of viewing baseline.

2. The method of clam 1 wherein choosing the second medium comprises choosing the second medium because the second medium causes a net orthogonal acoustic energy absorption ratio of the net medium to be greater than a corresponding first orthogonal acoustic energy absorption ratio of the first medium.

3. The method of clam 1 wherein choosing the second medium comprises choosing the second medium because the second medium causes a net birefringence of the net medium to be greater than a corresponding first birefringence of the first medium, and adding the second medium to the first medium to form the net medium.

4. The method of clam 1 wherein choosing the second medium comprises choosing the second medium because the second medium causes a net elastic modulus of the net medium to be lower than a corresponding first elastic modulus of the first medium.

5. A product with improved acousto-optic activity for acoustic imaging, the product comprising:
    a net medium,
    the net medium being formed by adding a second medium to a first medium,
    the first medium having a first acousto-optic activity which causes a first optical property of the first medium to change with changes in acoustic energy intensity interacting with the first medium,
    the net medium having a net acousto-optic activity which causes a net optical property of the net medium to change with changes in acoustic energy intensity interacting with the net medium, the net acousto-optic activity being greater than the first acousto-optic activity when the first acousto-optic activity is measured at a predetermined first optimum angle for imaging the first medium and at a predetermined viewing baseline, and the net acousto-optic activity is measured at a predetermined net optimum angle for imaging the net medium and at the predetermined viewing baseline.

6. The product of claim 5 wherein the second medium has a property which causes a net orthogonal acoustic energy absorption ratio of the net medium to be greater than a corresponding first orthogonal acoustic energy absorption ratio of the first medium.

7. The product of claim 5 wherein the second medium has a property which causes a net birefringence of the net medium to be greater than a corresponding first birefringence of the first medium.

8. The product of claim 5 wherein the second medium has a property which causes a net elastic modulus of the net medium to be lower than a corresponding first elastic modulus of the first medium.

* * * * *